United States Patent [19]

Shuck

[11] 4,446,433

[45] May 1, 1984

[54] APPARATUS AND METHOD FOR DETERMINING DIRECTIONAL CHARACTERISTICS OF FRACTURE SYSTEMS IN SUBTERRANEAN EARTH FORMATIONS

[76] Inventor: Lowell Z. Shuck, 401 Highview Pl., Morgantown, W. Va. 26505

[21] Appl. No.: 272,683

[22] Filed: Jun. 11, 1981

[51] Int. Cl.³ .......................... G01V 3/30; H01Q 1/04
[52] U.S. Cl. ...................................... 324/338; 343/877
[58] Field of Search ........................ 324/333, 334–338, 324/344, 346; 343/877, 903; 367/14, 35; 166/248, 250, 254; 455/40

[56] References Cited

U.S. PATENT DOCUMENTS

| | | | |
|---|---|---|---|
| 1,926,327 | 9/1933 | Burrell et al. | 324/338 X |
| 2,870,973 | 1/1959 | Carlson | 343/877 X |
| 2,992,325 | 7/1961 | Lehan | 324/338 X |
| 3,286,163 | 11/1966 | Holser et al. | 324/338 |
| 3,350,634 | 10/1967 | Hoehn | 324/338 |
| 3,378,097 | 4/1968 | Straus et al. | 324/338 X |
| 3,440,523 | 4/1969 | Gabillard | 324/338 X |
| 3,474,878 | 10/1969 | Loren | 367/35 X |
| 3,487,412 | 12/1969 | Rogers | 343/877 X |
| 4,109,717 | 8/1978 | Cooke | 166/250 |

Primary Examiner—Gerard R. Strecker

[57] ABSTRACT

The present invention is directed to a wireless fracture-mapping tool utilized for determining fracture directional and length characteristics of hydraulically induced fractures in subterranean earth formations containing recoverable energy values. The apparatus of the present invention utilizes antenna packages from which a transmitting antenna is propelled from a wellbore penetrating the earth formation into the fracture system. Signal-receiving antennas disposed on opposite sides of the transmitting antenna are likewise propelled into the fracture system for receiving signals from the transmitting antenna that are indicative of the fracture orientation and length. With the present invention the axial and singular three-dimensional location of the fracture or other fracture profiles may be readily mapped. This fracture-mapping system of the present invention aids in the recovery of the energy values from the subterranean earth formation by facilitating the strategic emplacement of wellbores to more efficiently recover the energy values in the subterranean earth formations.

18 Claims, 7 Drawing Figures

APPARATUS AND METHOD FOR DETERMINING DIRECTIONAL CHARACTERISTICS OF FRACTURE SYSTEMS IN SUBTERRANEAN EARTH FORMATIONS

BACKGROUND OF THE INVENTION

The present invention relates generally to a mechanism for mapping fracture systems in subterranean gas- and oil-bearing earth formations, and more particularly to such a mechanism which determines directional characteristics of a hydraulically induced fracture in earth formations through the use of and by implacing, transmitting and receiving antennas in the fracture to provide signals indicative of the length and orientation of the fracture.

Inducing fractures in subterranean earth formations has proven to be an important technique for increasing the recovering of energy values contained in the earth formation. In order to strategically place wells in earth formations to assure maximum gas or oil recovery from fractured formations during enhanced oil-recovery practices, the length and directional characteristics of the fracture need to be accurately determined. Several techniques have been utilized to map and characterize fractures during or subsequent to the formation of the fractures. The monitoring of acoustic and seismic emission during fracture propagation from surface sites or sensors in adjacent wellbores are typical of the systems utilized to map fracture characteristics. However, several conditions such as background and surface noise, lack of existing wells in area, low energy level of seismic signals emitted, prohibitive costs of providing new closely spaced wellbores for the purpose of fracture mapping, and data too complicated to analyze or which would require the expenditure of too much time, money and sophisticated equipment for the analyses significantly reduce the accuracy of such mapping techniques. Impression packers have been frequently used in wellbores to indicate the direction of fracture propagation from the wellbore. However, since the fracture orientation may abruptly change a short distance which may be as little as a few inches from the wellbore the information provided by using impression packers may not be sufficiently accurate for many purposes. All other methods of mapping subsurface fractures from the surface are indirect since they actually measure surface upheavel (vertical displacement and slope change). Such methods yield minimal solutions and due to the inherent filtering of any electrical or seismic signal result in very low accuracy and resolution. Surface and subsurface borehole tiltmeters fall into this category. The same problems also exist with the method of measuring the fracture induced electrical potential change by the use of surface electrical potential measuring arrays. All known methods use indirect methods of mapping fractures since such fractures have heretofore been considered inaccessible.

SUMMARY OF THE INVENTION

It is the primary aim or objective of the present invention to measure directly the fracture orientation by providing a wire-line fracture mapping apparatus and method wherein the exact axial and three-dimensional location of the fracture may be accurately determined. The mapping system of the present invention is utilized for describing the characteristic of the fracture systems originating at the wellbore and extending radially outwardly along any general plane or curved or warped surfaces along any horizontal, vertical or inclined orientation with respect to the longitudinal axis of the borehole. Generally, the objective of the present invention is achieved by an apparatus for determining the directional characteristics of a hydraulically induced fracture in a subterranean earth formation penetrated by a wellbore. The apparatus comprises signal-transmitting means including an antenna means, means are provided for movably supporting the signal-transmitting means in the wellbore at a location contiguous to the fracture, and means are provided for displacing or extending the antenna means into the fracture. Signal receiving means are oriented in the borehole and are provided with further antenna means that are disposable in a signal-receiving location with respect to said earth formation for receiving signals from the first-mentioned antenna means as it extends into the fracture.

The antenna means of the signal-receiving means comprises a pair of antennas which are spaced apart from one another along the longitudinal axis of the wellbore with the transmitting antenna disposed therebetween. Each of this pair of receiving antennas are displaced by suitable drive means into the earth formation to position the antennas in signal-receiving locations, preferably on opposite sides of the wellbore, with the transmitting antenna projecting generally orthogonally therebetween for accurately transmitting and receiving signals at various points within and along the fracture which are indicative of the fracture directional and length characteristics so as to provide an accurate description or map of the fracture system. Accurate mapping of such fracture systems can be utilized to significantly facilitate the recovery of the energy values contained within the fractured subterranean earth formation.

Other and further objects of the invention will be obvious upon an understanding of the illustrative embodiment and method about to be described or will be indicated in the appended claims, and various advantages not referred to herein will occur to one skilled in the art upon employment of the invention in practice.

DETAILED DESCRIPTION OF THE DRAWINGS

Preferred embodiments of the invention have been chosen for the purpose of illustration and description. The preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

Figure 1:
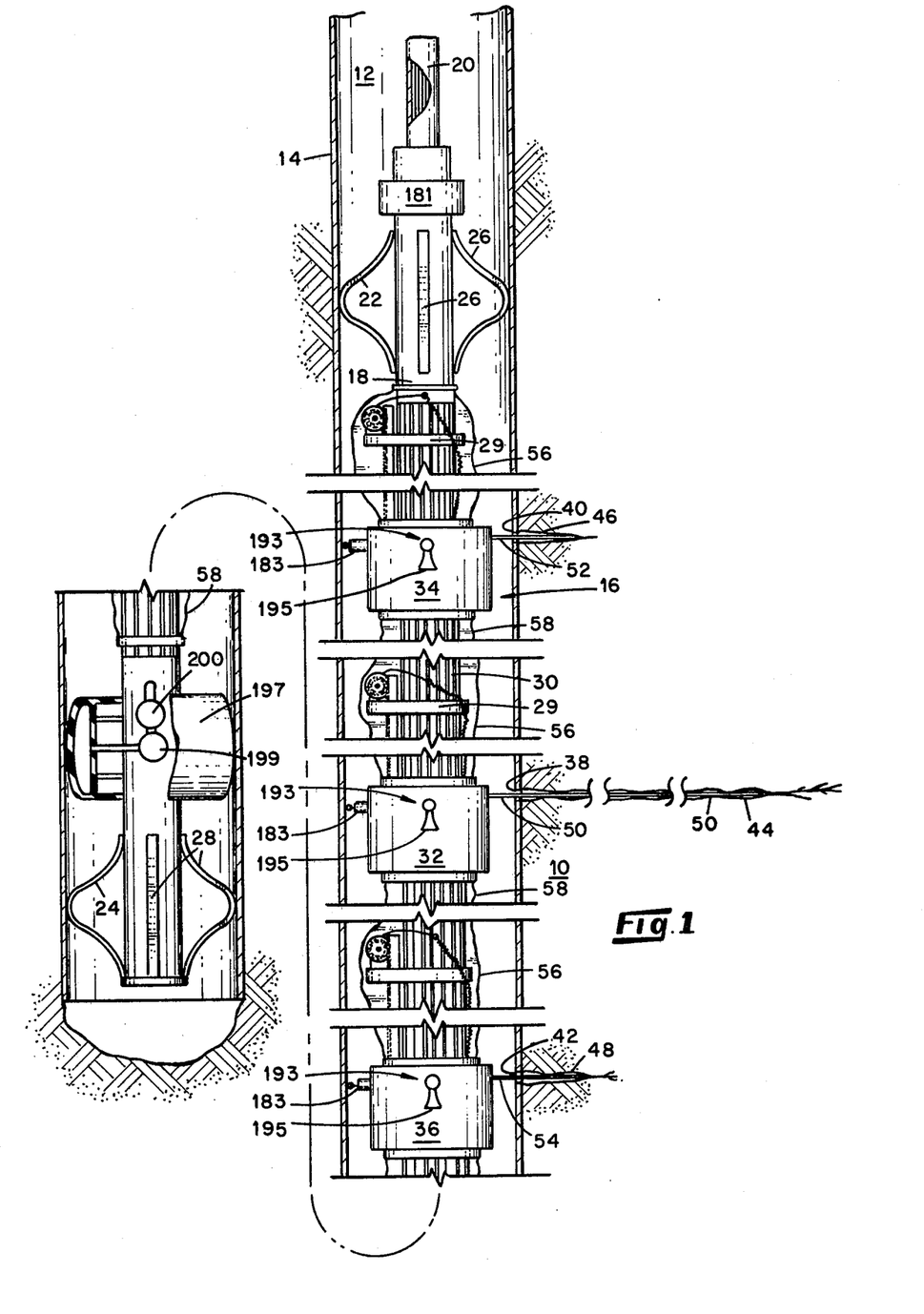
FIG. 1 is a somewhat schematic view illustrating a cased wellbore penetrating a subterranean earth formation in which the wireless fracture-mapping apparatus of the present invention is disposed in a fracture-mapping mode with the signal-transmitting and signal receiving antennas extending from the wellbore in a common direction for the purpose of illustration.

With reference to the accompanying drawings, especially FIG. 1, a subterranean earth formation 10, such as sandstone, shale, coal, or the like, which contains energy values such as gas, oil, or geothermal energy, is penetrated by a wellbore 12 which is provided with casing 14, preferably cemented in the conventional manner. The apparatus of the present invention can be utilized in a cased or uncased wellbore for providing fracture information, but for the purpose of this description a cased wellbore is utilized.

The fracture mapping apparatus of the present invention is generally shown at 16 and comprises a hollow tube or shaft 18 of a length in the range of about 10 to 30 feet. The shaft is suspended in the borehole by employing a conventional logging or other armored, multiple-conductor shielded cable 20. The cable 20 is utilized for vertically displacing the fractured mapping apparatus 16 as well as for providing conductors conveying the necessary power for operating the system components and conductors for retrieving the signals generated by the mapping apparatus 16 for further processing at the surface. Normally the shielded cable 20 would require about 30 or more individual conductors for the power and conventional signal-retrieving needs. However, even though a multiple number of conventional seven-conductor shielded cables may be utilized for this purpose, with downhole processing and conversion to digital signals, the digital transmission to and from the surface greatly reduces the number of conductors as well as shielding requirements for satisfactory signal/noise ratio.

The tube 18 may be maintained in a central orientation within the wellbore 12 by employing simple alignment mechanisms such as the adjustable flexible steel centralizers 22 and 24 shown disposed near the top and bottom ends of the tube 18. The centralizers 22 and 24 employ a plurality of flexible arms (3 shown) at 26 and 28 respectively, for maintaining the tube 18 in the central location of the wellbore 12 along the longitudinal axis thereof.

The tube 18 is provided with one or more splined sections 30 intermediate the ends thereof between the centralizers 22 and 24 with the splined sections being of a combined length in the order of about 18-20 feet. On a single splined section 30 of the tube there is contained the transmitting antenna package or assembly generally shown at 32 which is disposed intermediate receiving antenna packages or assemblies 34 and 36. These antenna systems 32, 34, and 36 are individually movable along the splined section of the shaft for orienting the antenna packages 32, 34 and 36 radially inwardly from perforations 38, 40 and 42, extending through the casing 14. For greater accuracy in locating the tip of the transmitting antenna in the fracture an additional receiving antenna system (not shown) like antenna systems 34 and 36 may be placed above or below antenna systems 34 and 36. If desired, this additional antenna system may be incorporated within the transmitting unit 32 and injected only a short distance (2-6 inches) into the fracture along side of the transmitting antenna. These perforations are formed in the casing 14 in any suitable manner, such as by the implacement of explosives capable of providing sufficient force to penetrate the casing 14 to provide the through-going passages or perforations through casing as well as forming a relatively short fracture hole (typically 3 feet) in the earth formation adjacent each perforation. In an open or uncased hole the fractures may be created by any suitable means such as hydraulically or explosively actuated mechanisms.

With the fractured mapping system 16 in place in the wellbore 12 or prior to the placement thereof, hydraulic fluid (not shown) is introduced into the wellbore 12 at a sufficient pressure to pass through the perforations to provide fractures 44, 46 and 48 in the earth formation 10 contiguous to the perforations 38, 40 and 42, respectively. The perforations 40 and 42 and fractures 46 and 48 are shown in FIG. 1 rotated about 90 degrees out of place in each direction for ease of illustration. In actual use of the present invention the relatively short fractures 46 and 48 are on opposite sides of the wellbore with the main fracture 44 disposed at some angle preferably 45° to 90° to each fracture 46 and 48. As shown, these fractures are horizontally oriented in what is commonly referred to as "pancake"-type fractures. However, at the depth of most oil- and gas-containing earth formations the fractures would most likely be of the vertical type typically with two vertically oriented fractures about 180° apart extending away from the wellbore along the planes of least resistance. Of course, these fractures may extend into the earth formation from the wellbore from various angles with respect to each other around the wellbore.

With the fractures 44, 46, and 48 previously induced or during the inducement thereof, the fracture-mapping system 16 is disposed in the wellbore 12 contiguous to the fractures and aligned with the antenna transmitting and receiving packages vertically and angularly oriented in such a manner as will be described in detail below so that the antennas may be displaced from the respective antenna packages through the perforations into the earth formation or fractures extending from the wellbore.

As shown in FIG. 1 the signal-transmitting antenna 50 is displaced from the package 32 through the perforation 38 into the centrally located fracture 44. This antenna 50 is of a length sufficient to extend at least about 10 feet from the wellbore 12 and, if desired, to a location near the end of the fracture 44 which may lie a few hundred feet from the wellbore 12. As the transmitting antenna 50 is extended into the fracture 44 with the aid of the fracturing fluid or by self-contained drive means as will be described below, the receiving antennas 52 and 54 from the signal-receiving packages 34 and 36 are extended through perforations 40 and 42 on opposite sides of the wellbores 46 and 48. These signal-receiving antennas 52 and 54 are preferably extendable into the smaller fractures or the small holes in the earth formation caused by the jet or charge induced perforations a distance sufficient to receive the signals from the transmitting antenna 50 without encountering deleterious interference due to the presence of the casing 14 and other wellbore characteristics. Normally a distance of about 1 to 6 inches from the wellbore 12 is sufficient for the receiving antenna extension.

When the antennas 50, 52 and 54 are in place or with the antenna 50 moving through the fracture 44, signals are generated or transmitted from the transmitting antenna 50 and received by the receiving antennas 52 and 54 to provide a three-dimensional reading of the fracture characteristics. Suitable signals utilized in the present invention include very high frequency (VHF), ultrahigh frequencies (UHF), microwave or millimeter electromagnetic radiation. This signal may be satisfactorily used for determining the fracture profile by either a phase detection or FM-swept frequency or pulse-echo ranging modes. Phase detection incorporates a means of phase measurement to extract radiation wave travel times associated with either UHF or VHF signals received at receiving antennas. For FM ranging, the swept transmitted signal is mixed with the receive signal and the difference in the frequency provides an accurate estimate of the range between distal ends of the transmitting and receiving antennas. For the pulse echo ranging mode, the received pulse time delay with respect to the time of the transmitted pulse provides a signal indicative of the position of the transmitting antenna with respect to the receiving antennas. Thus, as will be described in further detail below, with the azimuth of each of the antennas known before they are displaced into the earth formation and the subsequent signals derived from the transmitting antenna, the fracture orientation and length characteristics may be accurately mapped for facilitating the recovery of energy values in the earth formation.

The antenna packages illustrated in FIGS. 2-5 illustrate various antenna configurations and drive mechanisms therefore which may be utilized in the apparatus of the present invention. These antenna packages can be utilized for either as the signal-receiving or the signal-transmitting mechanism with the variations in the packages differing only in the particular modular instrumentation utilized depending upon whether it is used as a signal-transmitting or a signal-receiving antenna mechanism.

Figure 2:
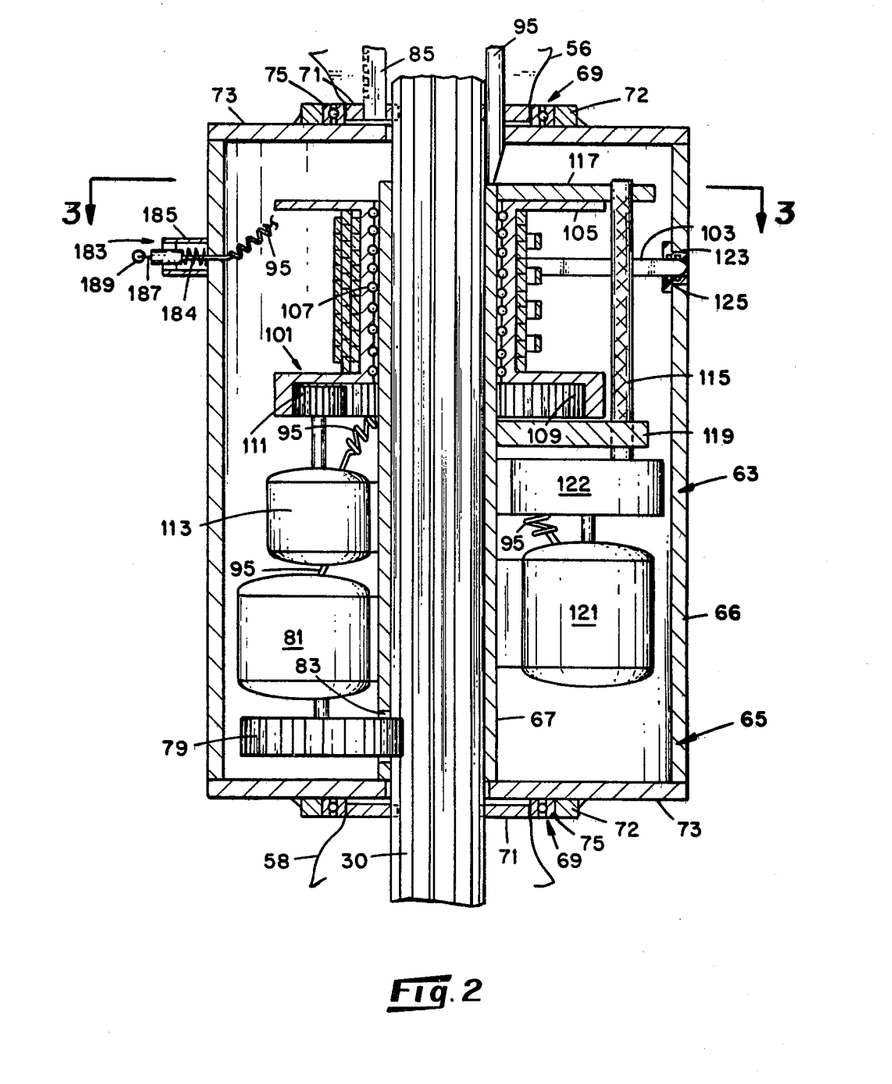
FIG. 2 is a vertical sectional view of one type of antenna system, antenna-drive and antenna-orienting arrangement which may be used in the fracture-mapping apparatus of the present invention.

A stretchable protective boot is attached to the tube 18 and each antenna package as generally shown at 56 above the package and at 58 below the package. These boots 56 and 58 prevent grit and other abrasives from plugging the splines in the tube 18. These boots and the antenna packages are filled with an oil, such as transformer oil, to prevent grit and other material from entering the boots and the packages.

Figure 3:
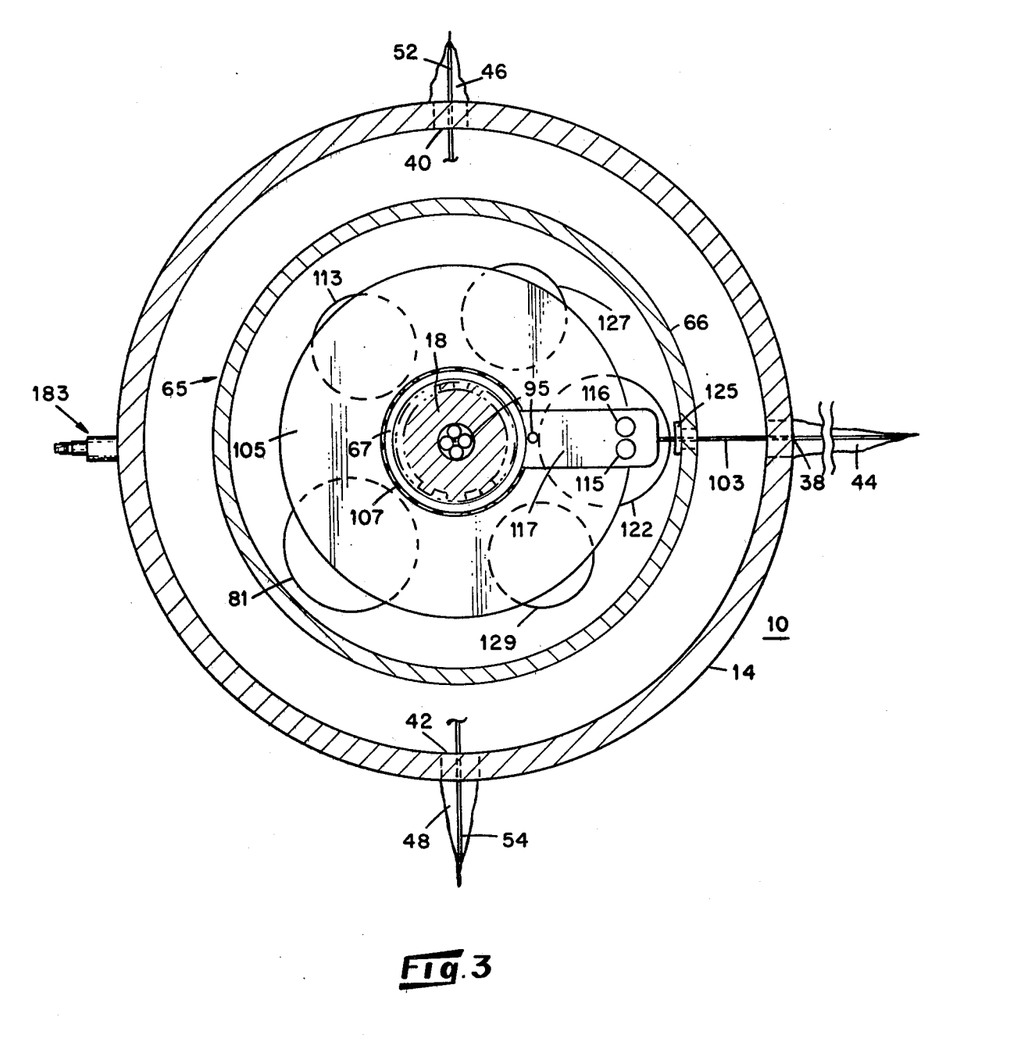
FIG. 3 is a top plan view of the FIG. 2 embodiment showing further details of the antenna system as well as showing the antenna as a transmitting antenna extending from the antenna drive system into the fracture in the subterranean earth formation surrounding the cased wellbore.

As shown in FIGS. 2 and 3, the antenna system 63 utilizes a flat or tape-like cable with a specially designed tip on the end of the shielded cable that functions as the antenna which may be driven into the fractures to any desired length. This antenna system 63 is shown comprising an annular closed housing 65 having an outer wall 66 and inner wall portion thereof defined by an annular sleeve 67 surrounding and spaced from the tube 18. The housing 63 encircles the tube 18 and is supported thereon so as to be relatively rotatable with respect thereto and also vertically displaceable thereby a bearing arrangement 69 at both ends of the housing 65 which comprises an annular splined section 71 which engages the splines in the tube 18 and is vertically spaced from the end walls of the housing. An annular flange or shoulder section 72 is affixed to each of the end walls 73 of the housing 65 and is radially outwardly spaced from the splined section 71. This annular flange 72 is coupled to the splined section 71 by an annular bearing package 75 which permits rotation of the annular housing 65 with respect to the tube 18 and the splined sections 71.

The antenna package 63 is rotatable about the tube 18 for the purpose of orienting the antenna 50, 52, or 54 with the particular perforation through the casing 14 which the antenna is to be driven into the fracture as well as for scanning the wellbore 12 for purposes which will be described in greater detail below. This rotation of the housing is achieved by employing the drive gear 79 which meshes with the splined section 30 of the tube 18 and is driven by a reversible motor 81 having suitable reduction gearing for rotating the housing 63 in either direction at the desired speed. The drive gear 79 contacts the splined section 30 of tube 18 through a slot 83 in the sleeve 67.

Figure 6:
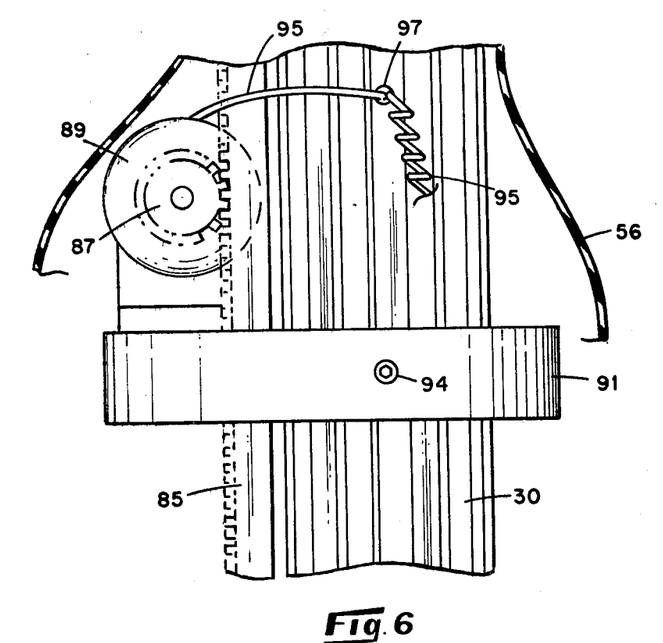
FIG. 6 is a vertical fragmenting view illustrating a rack and pinion arrangement utilized for vertically orienting the antenna system of FIGS. 3-5 along the longitudinal axis of the wellbore.
Figure 7:
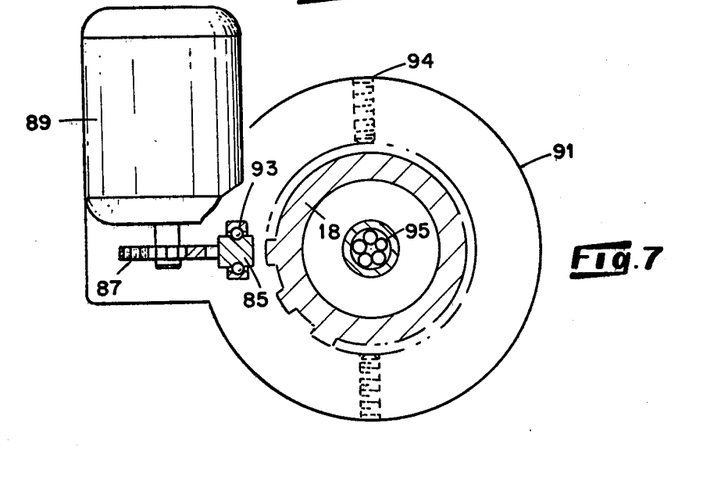
FIG. 7 is a top plan view showing further details of the drive arrangement of FIG. 6.

In addition to the rotation of the housing 65 the antenna package 63 can be displaced along the longitudinal axis of tube 18 to provide flexibility in aligning the antenna with the perforations in the casing 14. For example, the receiving antenna packages 34 and 36 may be vertically displaced along a tube 18 a distance in the range of 3 to 4 feet or more as needed and likewise the transmitting antenna package 32 is displaceable along the longitudinal axis of the tube 18 a distance of about 3 to 4 feet. The axial translations of the antenna packages allow for the scanning of the casing walls to assure that the antennas can be properly aligned with the perforations through the casing 14 regardless of the spacing between the longitudinally spaced-apart perforations. This longitudinal displacement of each antenna package may be provided by similar drive arrangements. As best shown in FIGS. 6 and 7, the vertical or longitudinal drive arrangement comprises a rack and pinion system in which a rack 85 of approximately four foot in length is attached to the upper splined section 71 of the bearing arrangement 69. This rack 85, in turn, engages a pinion 87 driven by a reversible motor 89 which is supported on an annular support 91 disposed about the tube 18. Bearings 93 in the annular support 91 are disposed about the rack 85 for facilitating the displacement of the rack 85 through the support 91 while being driven by the pinion 87. The annular support 91 is vertically adjustable along the length of the tube 18 by utilizing set screws 94.

Power leads and conductors for instrumentation signals from the antenna packages are provided by a conductor-arrangement 95 which extends from the center of the tube 18 through openings 97 in the tube 18. In order to assure that adequate vertical travel of the antenna packages may be achieved during the operation of the rack and pinion arrangement as well as rotational displacement of the antenna housings without fouling the conductors 95, the conductors 95 are preferably coiled in a manner similar to that utilized for extension or telephone cords. This coil arrangement assures that the movement of the antennae packages may be achieved both along the longitudinal axis of the tube 18 as well as in a rotational mode without fouling the conductors 95.

As shown in FIGS. 2 and 3, the antenna drive 101 for the flat or ribbon antenna 103 is provided by coiling or winding a suitable length of the antenna 103 upon an annular spool 105 which is disposed about the housing sleeve 67 and supported thereon by a bearing package 107 between the spool 105 and the sleeve 67 for permitting relative rotation of the spool 105 with respect to the housing 65. The spool 105 is provided with an annular gear 109 which meshes with drive gear 111 driven by a reversible drive motor 113 through suitable reduction gearing. The drive motor 113 is supported on the sleeve 67 in any suitable manner, such as bolting or the like. In addition to the antenna drive arrangement through the gear drive 109 and 111 the antenna 103 is also driven into the fracture (shown as fracture 44) by a knurled drive gear 115 disposed at the periphery of the spool 105 with the antenna 103 passing between the knurled drive gear 115 and an idler gear 116. The antenna drive gear 115 and the idler 116 are supported on stationary pillow blocks 117 and 119 disposed at the upper and lower end of the spool 105 and which are affixed to the housing sleeve 67 to maintain the antenna 103 in a fixed radial position with respect to the housing 65. The knurled drive gear is driven by a reversible motor 121 through suitable reduction gearing 122.

The antenna 103 is deployed or extended from within the housing 65 through an opening 123 in the wall 66. A suitable wiper 125 formed of Teflon or the like is disposed in this opening 123 to clean the antenna 103. By operating the antenna drive mechanism 101, the antenna 103, when it is in its desired alignment with a perforation through the casing 14, is driven into the fracture or other opening in the subterranean earth formation. The knurled drive 115 is engaged to extend the antenna through the opening 123 in the housing while the reversible drive motor 113 is engaged to rotate the spool 105 for unwinding the antenna therefrom through the knurled drive. This drive mechanism 101 is also useful for retrieving the antenna from the fracture or other opening in the earth formation when the fracture definition is completed. The reversal of the drive motors 113 and 121 allows for the antenna 103 to be retrieved from the fracture or other opening for subsequent use.

As shown in FIG. 3, instrumentation packages are contained within the housing in suitable locations, such as generally shown at 127 and 129. These instrument packages contain the necessary signal-transitting or signal-receiving circuits as well as microprocessors, antenna instrumentation feeds and the like as will be described in greater detail below.

Figure 4:
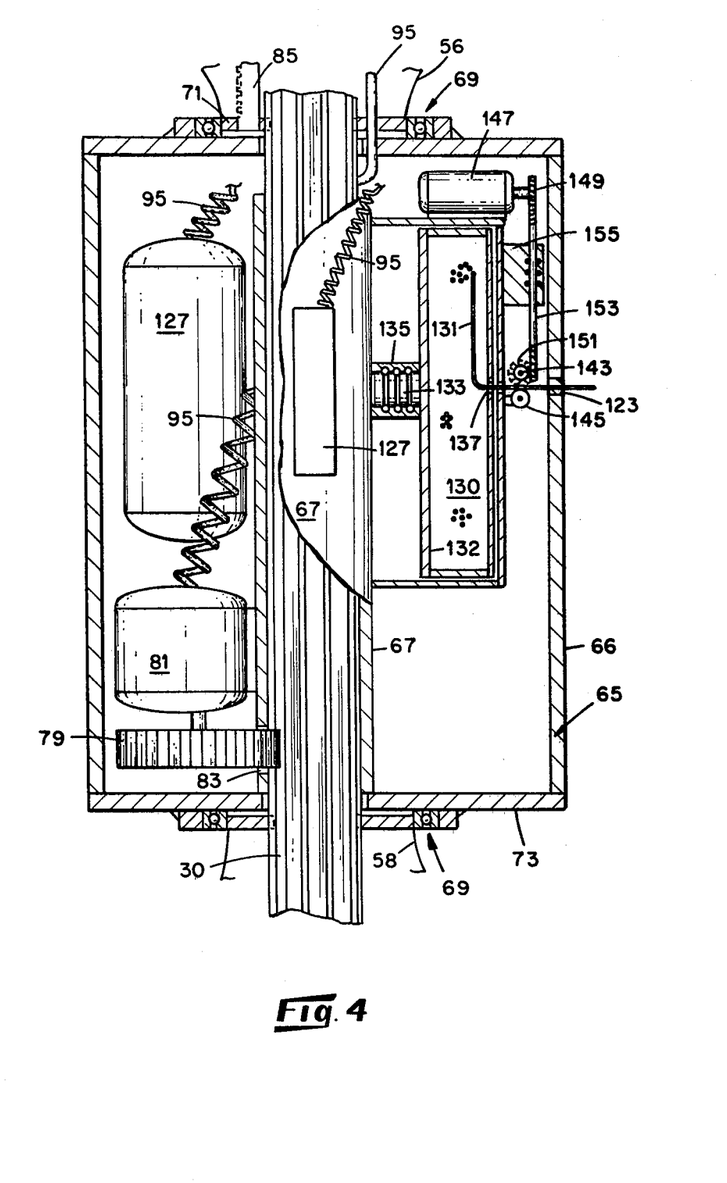
FIG. 4 is another form of antenna system which may be satisfactorily utilized in the fracture-mapping apparatus and method of the present invention.

FIG. 4 illustrates a different embodiment of antenna and antenna drive mechanism in which a plumber's snake-like arrangement as generally shown at 130 is used to contain and drive a round antenna 131. This antenna 131 is contained within a drum or spool 132 vertically mounted on the side of the sleeve 67. The antenna 131 is spirally wound within the annular u-shaped cavity of the drum 132 in the same manner as a plumber's snake. The mounting of the spool 132 may be achieved in any convenient manner, such as using a centrally disposed boss 133 received in a receptacle 135 affixed to the sleeve 67. The antenna 131 extends through an opening 137 in the spool 132 and is driven by a knurled drive wheel as generally shown at 143 with the antenna 131 extending between the drive wheel 143 and an idler wheel 145. The drive for the drive wheel 143 is achieved through a reversible drive motor 147. A beveled gear 149 is on the drive motor drive shaft while a similar beveled gear 151 is on the drive wheel 143. A drive shaft 153 extends between these bevel gears and is beveled at the ends thereof to mesh with the gears 149 and 151 to transmit power from the motor 147 to the drive wheel 143 for effecting the rotation thereof. This drive shaft 153 is mounted in a bearing support 155 for supporting and permitting the rotation of the drive shaft 153. As in the case of the previously described antenna package 63 the antenna 131 is uncoiled from the spool 132 and extended into the fracture the desired length by the operation of the motor 147. Upon completion of the mapping (transmitting-receiving) phase the operation of the motor 147 is reversed to retrieve the antenna 131.

Figure 5:
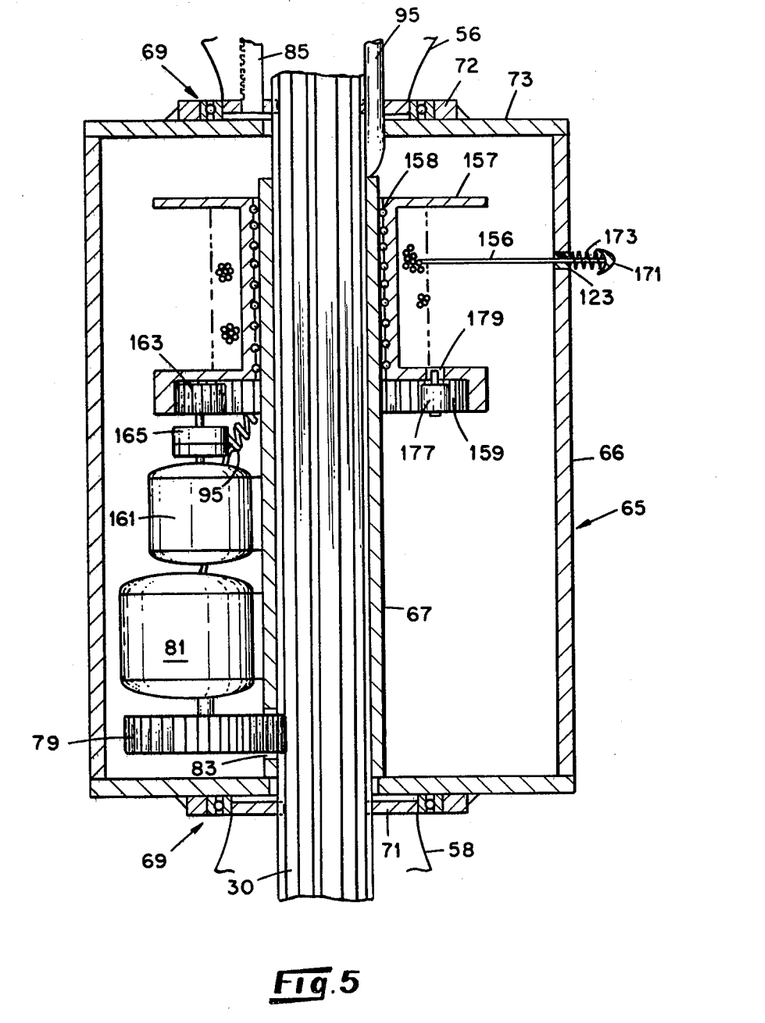
FIG. 5 is yet a further antenna system which may be utilized for the displacement of a "fishline"-type antenna into fractures in the earth formation surrounding the wellbore.

FIG. 5 illustrates a still further embodiment of an antenna drive mechanism which may be utilized in the present invention. This arrangement is similar to a fishing reel in which the antenna 156 is coiled about an annular spool 157 carried by the sleeve 67 through a bearing arrangement 158 similar to that of the bearing arrangement 107 in the FIG. 3 embodiment. An annular spool drive gear 159 is driven by a spool drive motor 161 through a gear 163 meshing with the annular spool drive gear 159. Between the drive motor 161 and the gear 163 is disposed a one-way clutch 165 so that as the 156 antenna is extended into the fracture, the spool or reel 157 becomes free-wheeling so as to allow for the unwinding of the antenna 156 from the spool 157 in a relatively uninhibited manner. If desired, a slight drag may be applied to the spool to assure that the antenna does not become entangled as it unwinds from the spool. To effect the extension of this antenna 156 the motion of the hydraulic fracturing fluid is utilized. As this fluid flows into the fracture it engages the concave surface of a cup-shaped or other hydrofoil shaped button 171 attached to the end of the antenna 156. With the fracturing fluid engaging this drag surface of hydrofoil or cup-shaped button 171 the fluid will propel or carry the antenna 156 into and along the fracture. To facilitate the initial drive of the antenna 156 into the fracture, a compression spring 173 is disposed between the cup-shaped button 171 and the housing wall 66 and is used to propel the antenna 156 into the fluid stream adjacent to the fracture. The initial rotation of the spool 157 as well as the propelling of the antenna 156 is achieved by releasing the spool 157 for rotation by employing a simple spool-lock mechanism, such as a solenoid 177 engaging a slot 179 in the sidewall of the spool 157. In this embodiment the fracturing fluid displaces the antenna 156 into the fracture but when the signal gathering is completed, the drive motor 161 is engaged and through the one-way clutch 165 drives the spool 157 to retrieve the antenna 156.

In the operation of the present invention the mapping assembly is inserted into the wellbore to approximately the desired location with the azimuth of the antenna packages being monitored by utilizing a gyro 181 (FIG. 1) affixed to the top part of the tube 18. With the mapping assembly positioned in approximately the desired location within the wellbore 12, each of the antenna packages 32, 34, and 36 are sequentially or simultaneously rotated up to approximately 370° scans to determine various casing peculiarities, particularly the location of the perforations 38, 40 and 42. To achieve this sensing of the perforation locations, each antenna package is provided with a suitable scanning mechanism, such as provided by a linear variable displacement transducer (LVDT) as generally shown at 183 (FIGS. 1–3). This LVDT 183 is mounted on the housing preferably below or above the antenna exiting opening, and is brought into contact with the casing by a spring 184 so that as the housing rotates it provides a signal indicative of the location of the perforations. The spring-loaded LVDT may be mounted in a solenoid 185 to maintain the LVDT 183 in a location contiguous to the housing until the antenna packages are in place within the casing 14. When the rotational scanning of the casing or wellbore is initiated the solenoid 185 is actuated to permit the LVDT 183 to move radially outwardly where the contact arm 187 of the LVDT 183, which is preferably provided with a ball 189 at the distal end thereof, is brought into contact with the casing 14. The ball 189 along with an extension limit stop on the LVDT arm 187 which is flexible in bending in the radial direction assures that the contact arm 187 will not hang up in the casing perforations as the housing 65 is rotated. When the orientation of the perforations and fractures have been adequately determined, the antenna package 32 is rotated to align the antennas thereof with the perforation through which the fracture is occurring or has occurred so as to initiate the propelling of the antenna into the fracture system while antenna packages 34 and 36 are aligned with perforations 40 and 42.

In order to determine which perforation through which the hydraulic fluid is flowing to initiate or reopen the fractures a suitable mechanism is utilized such as a flow meter 193. This flow meter is affixed to the housing 65 at a location preferably near the antenna opening 123 in the housing but is shown rotated 90° away from this location for the purpose of illustration. The flow meter 193 is provided with a relatively large inlet 195 and contains a fluid velocity measuring device such as a hot wire anemometer, tension on a small drag line with a bob, or a rotometer or impeller (not shown) so that as the hydraulic fluid flows into the fracture it will flow passed the rotometer and drive the rotometer or impeller to indicate large flow velocity and hence through which perforation the fracture is occurring.

In addition to the antenna packages the tube may be provided with an annular inflatable packer generally shown at 197 (FIG. 1) at the lower end of the tube 30. A suitable valving arrangement 199 and a pump 200 is shown for the purpose of initiating the inflation of the packer. This packer may be utilized to restrict and stop the flow of hydraulic fluids to locations below the intrument package during the operation of the system and to maintain the alignment of the mapping apparatus of the present invention within the casing 14 during the monitoring of the fracture.

In order to provide a more facile understanding of the present invention a typical fracture-mapping operation is hereinafter described.

The entire wire-line unit is lowered via cable 20 to the approximate location of fracture elevation to be mapped as may be determined from a casing perforation (38, 40 or 42) well log. The unit is locked into position by extending the already protruding spring steel centralizers 22 and 24 and if desired, depending upon the specific well conditions and mapping objectives, inflate the inflatable centralizer-packer 197. Each of the three (or four) antenna assemblies (32, 34, 36) is sequentially and independently operated to do a scan of the entire height of wellbore within each of their ranges. Perforations or any other borehole irregularities are thus mapped and through on-line, real-time data acquisition and processing are mapped on a computer graphics terminal in the truck-mounted control center next to the well on the surface. The operator then selects the three (or four) perforations (or angular positions in an uncased open hole) and positions one of the units over each of the 3 (or four) perforations selected. The top and bottom antennas 52 and 54 are then extended through the casing. Under some reservoir conditions it may be desirable for greater accuracy to also shoot perforations in the side of an open, uncased hole to allow the receiving antennas to extend 2 feet or 3 feet out beyond the wellbore wall. At this time fluid is injected down the wellbore at a low rate (without propant) which is just sufficient to build up wellbore pressure and open up the previously fractured but unproped fracture. At such time as the fracture is opened and the fluid velocity reaches a predetermined value the central signal-transmitting antenna 50 is deployed into the fracture 44 a few inches and held until final instrument check-out and calibration is performed. An antenna 50 is allowed to slowly move with the frac fluid (water, jel, foam, etc.). The high rate of high frequency transmissions along with real-time data processing allows the exact position of the antenna tip in three-dimensional space to be determined and thereby mapping the direction (also maximum conductance direction) of the propagating fracture since the antenna will follow the maximum stream velocity direction. When sufficient mapping at position one is completed, the three (or four) antennas are retracted along with the centralizers and the unit is either removed from the wellbore so proppant can be displaced to prop open the fractures just mapped, or the antenna units are rotated and translated to other perforations within their range, or the entire unit is raised or lowered to another zone in the wellbore to map fractures at the next desired elevation.

It will be seen that the present invention provides a needed mapping mechanism for describing fracture characteristics, especially the direction and length of the fracture propagation from any wellbore to facilitate the recovery of energy values from subterranean earth formations containing such energy values. Also, the present invention may be utilized to map natural fracture systems in registry with a wellbore as well as radial or axial deformities in a cased or open wellbore. The subject invention may be utilized in wellbores in horizontal, inclined and vertical orientations as long as the mechanism can be pumped or otherwise positioned in the desired location in the wellbores.

What is claimed is:

1. An apparatus for determining the directional and length characteristics of a natural or hydraulically induced fracture in a subterranean earth formation penetrated by a wellbore in registry with said fracture, comprising signal transmitting means including extendable antenna means, means for movably supporting the signal transmitting means in the wellbore at a location contiguous to said fracture, drive means supported by the signal transmitting means and coupled to the antenna means for extending the antenna means from said wellbore into the fracture, signal-receiving means oriented in the wellbore, means for movably supporting the signal-receiving means in the wellbore, and said signal-receiving means having antenna means disposed in a signal-receiving location with respect to said earth formation for receiving a signal from said antenna means within said fracture.

2. An apparatus as claimed in claim 1, wherein the first mentioned antenna means comprises an elongatable antenna, wherein said signal-receiving means having antenna means disposed in a signal-receiving location comprises a pair of antennas spaced-apart from one another along the longitudinal axis of the wellbore with the first-mentioned antenna disposed therebetween, and wherein means are provided for sufficiently extending each of said pair of antennas into said earth formation to independently position each of said antennas in a signal-receiving location.

3. An apparatus as claimed in claim 2, wherein an elongated tube is positionable in said wellbore at a location adjacent to the fracture, cable means are affixed to said tube at one end thereof for positioning said tube along the longitudinal axis of the wellbore, said signal-transmitting means and said signal-receiving means are carried by said tube, the means for movably supporting the signal-transmitting means and the signal-receiving means comprises moving means coupled to each of said signal-transmitting means and said signal-receiving means for effecting the displacement thereof along said tube, and wherein drive means are coupled to each of said signal-transmitting means and signal-receiving means and to said tube for effecting rotation thereof about said longitudinal axis of the tube prior to the extension of each of said antennas into the earth formation.

4. An apparatus as claimed in claim 3, wherein each of said signal-transmitting means and said signal-receiving means are disposed in a discrete annular housing disposed about said tube with a sleeve defining the inner wall of said housing being radially spaced from said housing, a spool means is disposed in said housing, the antenna is coiled within or about said spool means, a passageway extends through the outer wall of said annular housing for receiving said antenna means, and wherein the means for displacing the elongatable antenna into said fracture or said earth formation comprises further drive means carried by said housing for at least initially extending the antenna from the wellbore into the earth formation.

5. An apparatus as claimed in claim 4, wherein gear means are carried by said spool means, and wherein gear-driving means are disposed in said housing and are engageable with said spool means for effecting the rotation thereof for coiling the antenna within or about said spool means.

6. An apparatus as claimed in claim 4, wherein said tube is provided with a longitudinally splined portion intermediate the ends thereof, the annular housings carrying said signal-transmitting means and said signal-receiving means are disposed on said splined portion of the tube in longitudinally spaced-apart locations, bearing means are disposed adjacent opposite ends of said housing for rotatably supporting said housing on the tube, wherein the first-mentioned drive means include gear means meshing with the splines on said splined portion of the tube, and wherein gear-driving means carried by said housing rotate said gear means for effecting rotation of the housing about the longitudinal axis of the tube.

7. An apparatus as claimed in claim 4, wherein the means for movably supporting the signal-transmitting means and said signal-receiving means comprise discrete drive means coupled to each of said housings for effecting the selective displacement of each housing along the longitudinal axis of said tube.

8. An apparatus as claimed in claim 7, wherein each of said discrete drive means comprise a rack and pinion arrangement, the rack is coupled to said housing, the pinion and pinion drive means are carried by said tube at a location longitudinally spaced from the housing with said pinion engaging said rack.

9. An apparatus for determining the directional and length characteristics of a natural or hydraulically induced fracture in a subterranean earth formation penetrated by a wellbore, comprising an elongated tube, means for movably supporting the tube in the wellbore, at least three annular housings carried about said tube at longitudinally spaced-apart locations, moving means coupled to each of said housings for selectively displacing each housing along a longitudinal portion of said tube, means coupled to each of said housings for rotating each housing about the longitudinal axis of the tube, a first antenna carried by the second or intermediate housing, first antenna drive means for extending the first antenna from said housing into a fracture extending into the earth formation from the wellbore, signal-transmitting means within said intermediate housing for transmitting a signal through said first antenna into said earth formation, a second antenna carried by the first housing, a third antenna carried by the third housing, second and third antenna drive means respectively coupled to said second antenna and said third antenna for extending the second and third antennas into the earth formation on substantially opposite sides of the wellbore and at an angle to the direction of extension of the first antenna, and signal-receiving means in said second and third housings coupled to the second and third antennas for receiving the signal transmitted from the first antenna.

10. An apparatus as claimed in claim 9, wherein said tube has a longitudinally extending externally splined portion intermediate the ends thereof and encompassed by said housings, wherein each of said housings has an inner wall radially spaced from said tube, wherein bearing means are at opposite ends of each housing and coupled to said tube for rotatably supporting each housing on the tube, the means for rotating each of said housings comprises gear means meshing with the splines on the tube and gear drive means carried within the housing for driving said gear means to effect rotation of said housing about said tube.

11. An apparatus as claimed in claim 10, wherein said moving means coupled to each of said housings comprises a rack and pinion arrangement for each housing with one end of said rack coupled to the housing at a portion of said bearing means that is stationary with respect to the rotation of said housing, pinion and pinion drive means are carried by the tube at a location longitudinally spaced from the housing with said rack being engaged by said pinion to effect longitudinal displacement of said housing along said tube.

12. An apparatus as claimed in claim 9, wherein at least one of said first, second, or third housings is provided with a spool disposed about said tube, the antenna in said at least one of said housings is coiled about said spool with one end of the antenna being in registry with and projectable through an opening in a radially outermost wall of the housing, bearing means are disposed between said spool and a spool supporting wall in said housing for providing rotation of said spool within the housing, and wherein drive means are coupled to said spool for effecting rotation thereof.

13. An apparatus as claimed in claim 12, wherein the antenna drive means coupled to the antenna coiled about said spool comprises rotatable means engaging said antenna near the end thereof in registry with the opening in said housing, motor means coupled to said rotatable means to provide rotation thereof for effecting movement of said antenna with respect thereto, and wherein said antenna drive means and said drive means coupled to said spool are operated together to displace the antenna from said spool into said earth formation or to retrieve the antenna from earth formation and recoil it about said spool.

14. An apparatus as claimed in claim 9, wherein the antenna drive means coupled to the antenna coiled about said spool comprises a fluid displaceable concave member affixed to the distal end of the antenna end projecting through the opening in said outermost wall and a compression spring disposed between said concave member and said housing for providing the initial displacement of the antenna into said earth formation, wherein selectively operable spool-locking means engage said spool for inhibiting rotation thereof, and wherein the drive means coupled to said spool comprise motor means coupled to said spool through one-way clutch means to rotate said spool for retrieving the antenna carried thereby from said earth formations.

15. An apparatus as claimed in claim 9, wherein at least one of said first, second, or third housings is provided with a vertically oriented drum disposed between the tube and a radially outermost wall of said housing and has an annular U-shaped cavity therein, said antenna is coiled within said drum and is extendable therefrom through a centrally oriented opening in said drum, a radially outermost wall of each housing has an opening therethrough for receiving said antenna, rotatable means engage said antenna for effecting displacement thereof relative to said earth formation, and motor means are coupled to said rotatable means for effecting the rotation thereof.

16. A method for mapping a fracture system in a subterranean earth formation penetrated by a wellbore, comprising the steps of extending signal-transmitting means from a wellbore into a fracture in the earth formation in registry with the wellbore, extending at least two signal receiving means from the wellbore into the earth formation at locations spaced from one another substantially on opposite sides of said wellbore, with said signal-transmitting means being disposed between and extending from the wellbore into the fracture disposed at an angle to the positions of said signal-receiving means in the earth formation, and transmitting a signal from the signal-transmitting means as the latter is extended into the fracture to provide a signal at each of said signal-receiving means indicative of the direction of the fracture in the earth formation.

17. The method claimed in claim 16, including the additional steps of vertically displacing and rotating the signal-transmitting means in the wellbore for aligning the signal-transmitting means with said fracture prior to the step of extending the signal-transmitting means into the fracture.

18. The method claimed in claim 17, including the additional steps of independently vertically displacing and rotating each of the signal-receiving means in the wellbore to align the signal-receiving means with openings in the earth formation on said substantially opposite sides of the wellbore prior to extending each of the signal-receiving means into said earth formation.

* * * * *